United States Patent
Harding et al.

(10) Patent No.: US 9,434,362 B2
(45) Date of Patent: Sep. 6, 2016

(54) SYSTEM AND METHOD TO CONTROL REGENERATIVE BRAKING

(75) Inventors: John Harding, Ann Arbor, MI (US); Erik Kauppi, Ann Arbor, MI (US)

(73) Assignee: Current Motor Company, Ann Arbor, MI (US)

( * ) Notice: Subject to any disclaimer, the term of this patent is extended or adjusted under 35 U.S.C. 154(b) by 999 days.

(21) Appl. No.: 12/748,833

(22) Filed: Mar. 29, 2010

(65) Prior Publication Data
US 2011/0233994 A1    Sep. 29, 2011

(51) Int. Cl.
| | |
|---|---|
| *B60T 8/64* | (2006.01) |
| *B60T 8/17* | (2006.01) |
| *B60T 1/10* | (2006.01) |
| *B60W 10/08* | (2006.01) |
| *B60W 10/184* | (2012.01) |
| *B60W 30/18* | (2012.01) |
| *B60L 7/26* | (2006.01) |
| *B60T 7/00* | (2006.01) |

(52) U.S. Cl.
CPC ............... *B60T 8/1706* (2013.01); *B60L 7/26* (2013.01); *B60T 1/10* (2013.01); *B60W 10/08* (2013.01); *B60W 10/184* (2013.01); *B60W 30/18127* (2013.01); *B60L 2200/12* (2013.01); *B60T 2270/604* (2013.01); *B60W 2540/12* (2013.01); *B60Y 2200/12* (2013.01)

(58) Field of Classification Search
CPC ............... B60T 1/10; B60T 7/00; B60T 7/08; B60T 8/00; B60T 8/17; B60T 8/171; B60T 8/172; B60T 8/174; B60T 8/1706; B60T 2270/604; B60T 11/103; B60T 13/586; B60T 13/66; B60T 13/74; B60T 2270/60; F16D 2121/24; F16D 2129/10; F16D 2500/1024; B62L 3/02; B60L 7/24; B60L 7/26; B60L 2200/12; B60W 10/08; B60W 10/184; B60W 30/18127; B60W 2540/12; B60Y 2200/12
USPC ....... 303/3, 15, 20, 152, 9.64, 137; 318/371, 318/372, 375, 376; 701/70
See application file for complete search history.

(56) References Cited

U.S. PATENT DOCUMENTS

| | | | |
|---|---|---|---|
| 3,921,745 A | 11/1975 | McCulloch et al. | |
| 4,627,519 A | * 12/1986 | Larsen et al. | ............ 188/1.11 R |
| 5,378,053 A | 1/1995 | Patient et al. | |
| 5,505,527 A | 4/1996 | Gray et al. | |

(Continued)

FOREIGN PATENT DOCUMENTS

| | | | |
|---|---|---|---|
| GB | 591470 | | 2/1945 |
| JP | 201035376 A | * | 2/2010 |

(Continued)

*Primary Examiner* — Melody Burch
(74) *Attorney, Agent, or Firm* — Mintz Levin Cohn Ferris Glovsky and Popeo, P.C.

(57) ABSTRACT

A braking system for an electric vehicle has a first wheel having a first friction brake and an electric motor and a second having a second friction brake. A first user-actuated brake lever is coupled to the first friction brake. The first brake lever has a first sensor indicating actuation of the first brake lever. A second user-actuated brake lever is coupled to the second friction brake. The second brake lever has a second sensor indicating actuation of the second brake lever. An electronic control unit electronically coupled to the first and second sensors and the electric motor commands the electric motor to operate as a generator when at least one of the brake levers is actuated.

19 Claims, 3 Drawing Sheets

(56) References Cited

U.S. PATENT DOCUMENTS

| | | |
|---|---|---|
| 5,839,533 A | 11/1998 | Mikami et al. |
| 5,839,800 A | 11/1998 | Koga et al. |
| 5,915,801 A | 6/1999 | Taga et al. |
| 5,951,116 A * | 9/1999 | Nagasaka et al. ............... 303/14 |
| 6,086,166 A | 7/2000 | Fukasawa |
| 6,724,165 B2 | 4/2004 | Hughes |
| 6,874,592 B2 | 4/2005 | Yokotani et al. |
| 6,910,747 B2 * | 6/2005 | Tsunehara ..................... 303/152 |
| 7,167,783 B2 | 1/2007 | Park et al. |
| 7,314,109 B2 | 1/2008 | Holland |
| 7,362,065 B2 | 4/2008 | Takano |
| 2004/0056616 A1 | 3/2004 | Honda |
| 2006/0076171 A1 * | 4/2006 | Donnelly et al. ............ 180/65.2 |
| 2007/0278853 A1 * | 12/2007 | Bayer et al. ................. 303/9.64 |
| 2010/0292882 A1 * | 11/2010 | Murata ........................... 701/22 |
| 2011/0074204 A1 * | 3/2011 | Kim ................................. 303/3 |
| 2012/0067676 A1 * | 3/2012 | Bramscher et al. ......... 188/71.1 |

FOREIGN PATENT DOCUMENTS

| | | |
|---|---|---|
| WO | 2005/039964 A1 | 5/2005 |
| WO | WO-2009077835 A1 * | 6/2009 |

* cited by examiner

SYSTEM AND METHOD TO CONTROL REGENERATIVE BRAKING

BACKGROUND

1. Technical Field

The present disclosure relates to an electric vehicle having regenerative braking and operator controls related to the regenerative braking.

2. Background Art

Market share of electric vehicles (EVs) and hybrid electric vehicles (HEVs) is increasing due to concerns about pollution in dense population centers and a desire to increase overall operating vehicular efficiency. One important advantage that EVs and HEVs have over vehicles powered solely by an internal combustion engine is that the electric motor coupled to vehicle wheels can be operated as a generator to recover braking energy and store that energy in an onboard vehicle battery for later use.

Many patents describe systems and methods for performing regenerative braking in the context of a four-wheeled automotive vehicle in which the operator indicates a braking desire through a single actuator, e.g., a brake pedal. In the case of two-wheeled vehicles, however, it is common for the operator to be supplied two brake inputs. Typical motorcycles provide a hand brake coupled to a front wheel brake and a foot pedal coupled to a rear wheel brake. Typical step-through scooters normally have levers for operation of the front brake with the right hand and the rear brake with the left hand. The operator chooses to operate one or both of the brake input devices depending on the level of braking desired, the vehicle speed, the traction conditions, etc. In an EV or HEV, in which two brake input devices are provided, operator input is to be mapped into an appropriate braking response in an environment including both friction braking and regenerative braking.

SUMMARY

A braking system and method for an electric vehicle is disclosed. A first wheel coupled to the electric vehicle has a first friction brake and an electric motor and a second wheel coupled to the electric vehicle has a second friction brake. A first user-actuated brake lever is coupled to the first friction brake. The first brake lever has a first sensor indicating actuation of the first brake lever. A second user-actuated brake lever is coupled to the second friction brake. The second brake lever has a second sensor indicating actuation of the second brake lever. An electronic control unit is electronically coupled to the first and second sensors and the electric motor. The electronic control unit commands the electric motor to generate electricity based on a signal from at least one of the first and second sensors indicating that at least one of the first and second brake levers has been actuated. In one embodiment, the first and second sensors are switches indicating that the associated brake actuator is actuated. The amount of electricity that the motor is commanded to generate is a first fraction of the maximum regeneration capacity in response to the first switch alone being activated, a second fraction of the maximum regeneration capacity in response to the second switch alone being activated, and a third fraction of the maximum regeneration capacity if response to both switches being activated. In an alternative embodiment, at least one of the sensors is a position sensor indicating an amount of brake actuator travel. The position sensor may be a linear position sensor, a rotary position sensor, an angular position sensor, or any other suitable sensor. In such a case in which the sensor's signal indicates brake actuator travel, the regenerative braking alone is applied in a monotonically increasing fashion with respect to brake actuator travel within a first range of brake actuator travel. The friction brake is additionally applied within a second range of brake actuator travel.

Per embodiments of the disclosure, a riding experience similar to what the user expects from a conventional scooter/bike is provided while still capturing electrical energy. Recovered electrical energy increases the overall operational efficiency of the scooter and can lengthen the time between recharges in a fully electric system.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
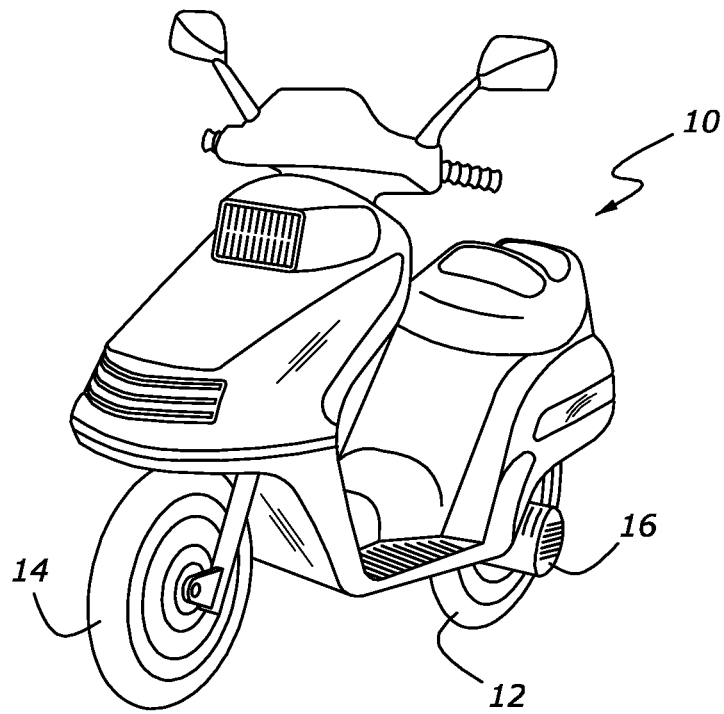
FIG. 1 is a sketch of a motor scooter.

FIG. 1 shows a motor scooter 10 having a first wheel 12 and a second wheel 14. A friction brake is provided on each of wheels 12 and 14. Additionally, an electric motor 16 is provided on a hub of wheel 12. Electric motor 16 provided at the hub of wheel 12 is one non-limiting example. Electric motor 16 may alternatively be provided any where on scooter 10 and driving wheel 12 via any suitable coupler. In yet another alternative, electric motor 16 drives wheel 14. Motor scooter 10 of FIG. 1 is an EV. However, in an alternative embodiment, scooter 10 is provided with an internal combustion engine and scooter 10 is a HEV. Wheels 12 and 14 are wheel and tire combinations. But, for the sake of simplicity are referred to as wheels in the present disclosure.

Figure 2:
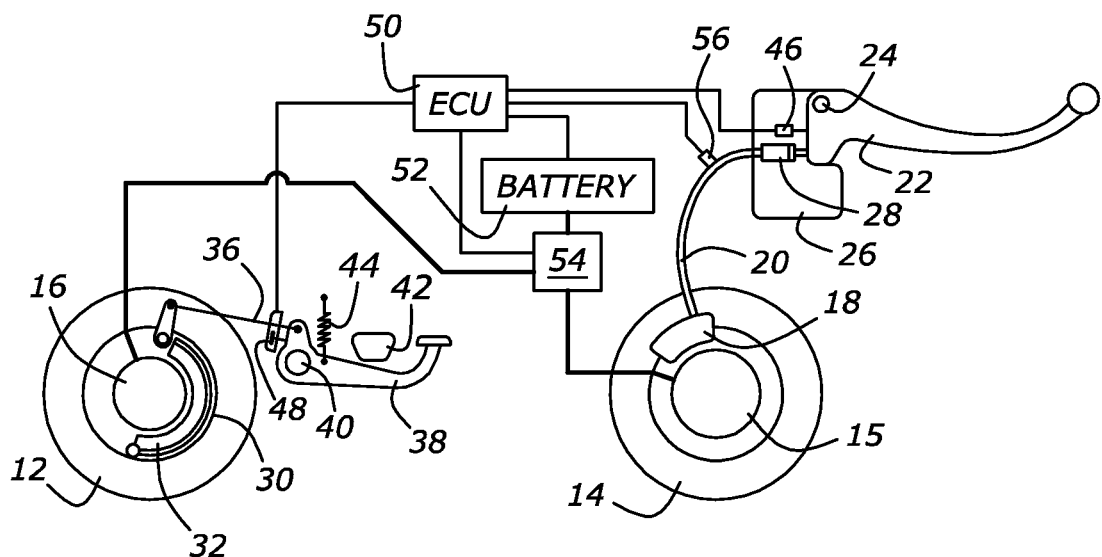
FIG. 2 is a schematic drawing of components of a motor scooter related to braking.

In FIG. 2, a schematic representation of scooter 10 is shown. A disc brake 18 is provided proximate to wheel 14. A spring associated with the calipers of disc brake 18 prevents the caliper from contacting the disc of disc brake 18 when the friction brake is not actuated. Disc brake 18 is actuated via a hydraulic line 20, which is actuated by brake lever 22. Brake lever 22 pivots about pin 24, which is inserted through brake lever 22 and a housing 26. When brake lever 22 is actuated, piston 28 displaces hydraulic fluid in hydraulic line 20, thereby overcoming the spring associated with the calipers. The calipers contact the disc brake 18, thereby providing a braking torque to wheel 12.

Also shown in FIG. 2 is a drum brake 30 associated with wheel 12. When brake shoe 32 is pulled into contact with the inside surface of wheel 12, a braking torque is generated on wheel 12. Brake shoe 32 is actuated by brake arm 34, which in turn is pulled by cable 36 under actuation of brake pedal 38. Brake pedal 38 pivots around pin 40 and hits a stop, possibly foot peg 42 acting as the stop. A spring 44 maintains brake pedal 38 against the stop. The operator applies force to brake pedal 38 to overcome the force of spring 44 to cause the brakes to apply a braking torque at wheel 12.

In the embodiment shown in FIG. 2, electric motor 16 is provided on the hub of wheel 12 and an electric motor 15 is provided on the hub of wheel 14, which is but one example. In other embodiments, only one motor is provided on scooter 10.

In FIG. 2, a hydraulic-actuated, disc brake is provided on wheel 14 and a drum brake is provided on wheel 12. A hand-operated brake lever is coupled to the brake on wheel 14 and a foot-operated brake pedal is coupled to the brake on wheel 12. However, this particular example is not intended to be limiting in any way. It is common for both wheels to either have disc brakes or drum brakes. In another embodiment, the brakes are both actuated by hand-operated levers. Any combination of disc/drum, hydraulic/cable, and hand/foot operated brakes is within the scope of the present disclosure.

The vehicle described in regards to FIG. 2 is a two-wheeled vehicle. However, the disclosure is not limited to two-wheeled vehicles. An example three-wheeled embodiment has one rear wheel driven by the electric motor with two front wheels mechanically coupled to provide Ackerman steering. In another example, one front wheel is provided and two wheels each having integral electric motors. There are many more possibilities beyond these two example architectures for three, or more, wheeled vehicles.

Also shown in FIG. 2 are brake sensors 46 and 48 which are proximate brake lever 22 and brake pedal 38, respectively. Brake sensors 46 and 48 are electronically coupled to electronic control unit (ECU) 50. A physical connection between ECU 50 and brake sensors 46 and 48 is shown in FIG. 2. However, any suitable electronic communication between the sensors and ECU 50, such as wireless communication, can be used. It is common for switches to be provided on brake actuators so that a brake light is illuminated when either brake is actuated. Thus in one embodiment, sensors 46 and 48 are switches, which provide an indication to ECU 50 whether the brake is actuated or not, but no information about the extent of travel of the brake actuator. In another embodiment, sensors 46 and 48 are linear position sensors, which have a pin contacting the brake lever or pedal. Sensors 46 and 48 provide a signal indicative of the travel of brake lever 22 and brake pedal 38, respectively.

Electric motors 15 and 16 are coupled to a battery 52 and to ECU 50 via a motor controller 54. In other embodiments, motor controller 54 function is integrated into ECU 50. Electric motors 15 and 16 can be operated as motors to provide a positive torque to wheels 14 and 12, respectively. Or, under command of ECU 50, electric motors 15 and 16 can be operated as generators, thereby providing a braking torque, or negative torque, on wheel 14 and 12, respectively. Such operation of electric motors is sometimes referred to as regenerative braking. As a motor, electric motors 15 and/or 16 draw electrical energy from battery 52; and, as generators, electric energy generated in electric motors and/or 16 is stored in battery 52. Electric motors 15 and 16 need not be operated in lock step. Any combination of the motors operating as generators, motors, or not at all is within the scope of the disclosure. The discussion below concerning regenerative braking refers to motor 16, but applies equally well to motor 15, in embodiments with two electric motors.

Friction brakes refer to disc or drum brakes associated with wheels 12 and 14. Regenerative braking is provided by electric motor 16 operating as a generator. As regenerative braking recovers energy as electrical energy that would otherwise be lost to friction braking, in one embodiment, regenerative braking is applied prior to actuating friction brakes. That is, when brake lever 22 and/or brake pedal 38 are actuated within a lower range of travel, regenerative braking is employed. When brake lever 22 and/or brake pedal 38 are actuated within a higher range of travel, the friction brake(s) are also actuated in addition to electric motor 16 acting as a regenerative brake. To support such operation, there is a regeneration only zone such that when brake lever 22 or brake pedal 38 are actuated within the first range of travel, the friction brakes are not applied. Such friction brakes apply a braking torque when the brake actuator is within a second range of travel.

Figure 3A:
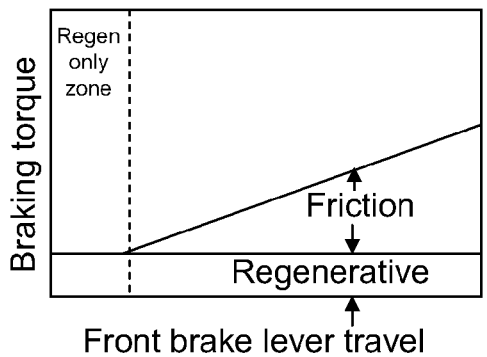
FIGS. 3A-C, FIGS. 4A-C, and FIGS. 5A-B are graphs of braking torque provided as a function of brake actuator travel according to various embodiments of the disclosure.
Figure 3B:
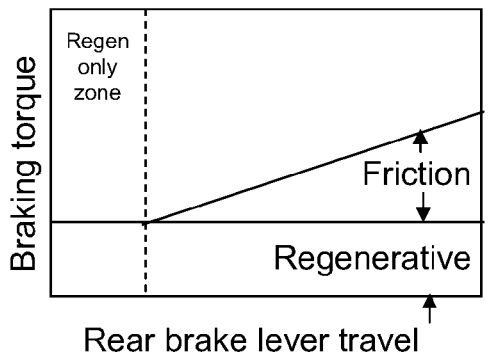
Figure 3C:
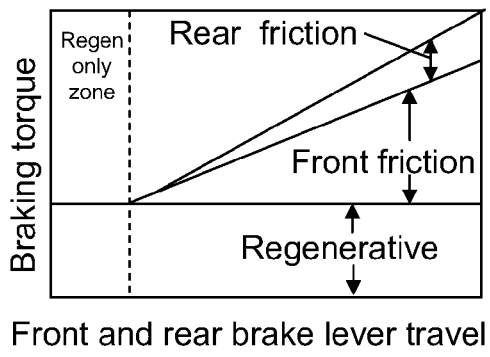

In FIGS. 3A-C, plots of braking torque as a function of brake lever travel is shown. The term brake lever refers to a hand-operated lever, a foot-operated pedal, or any suitable actuator. The case in which only the front brake lever is actuated is shown in FIG. 3A. The total braking torque comprises regenerative and friction components. In the embodiments shown in FIG. 3A-C, the regenerative braking is turned on at a particular fraction of the maximum available regeneration braking quantity. Within a lower range of brake travel is a regeneration only zone, which is where there is no friction braking, but regenerative braking is applied. When the front brake lever is actuated, the regenerative braking is applied to the rear wheel at a particular fraction of the maximum, e.g., ⅓. When the operator moves the brake lever past the regeneration only zone, i.e., into a higher range of brake lever travel, the friction brake is also applied. The braking torque continues to increase with increasing brake lever travel until the maximum brake lever travel and/or braking torque is achieved.

In FIG. 3B is an embodiment showing braking torque response upon actuation of the rear brake lever alone. The regenerative braking torque fraction of the maximum is greater in this case, e.g., ⅔, than that shown in FIG. 3A. Also, the regeneration only zone (or lower range in braking lever travel) is wider. The fraction of maximum regenerative braking torque and the regeneration only zone width are provided by way of example and not intended to be limiting in any way. When the rear brake lever is actuated beyond the regeneration only zone, the friction brake coupled to the rear wheel is also actuated, with braking torque increasing proportionally with rear brake lever travel. The linear relationship between friction braking torque and lever travel is simply one example. Other types of monotonically-increasing behavior may also be employed.

In FIG. 3C, the resulting braking torque when both the front and rear brake levers are actuated simultaneously is plotted. In such a case, the maximum regenerative braking may be applied in the regeneration only zone. Or, in another embodiment, a fraction less than the maximum regenerative braking capacity is applied. The front friction brake is applied at a lower lever travel, in this example. Continued actuation of the brake lever causes the rear friction brake to be applied. Ultimately, the maximum braking torque is available at the end of the brake lever travel. An unlimited number of combinations of one brake lever being actuated more than the other brake lever or applying one brake lever faster than another exist. However, figures such as FIGS. 3A-C provide sufficient information to determine any such combination. Furthermore, the graphs in FIGS. 3A-C are not intended to be limiting in any way. Many variations are possible without departing from the scope of the disclosure. For example, it is common for braking torque, due to the friction brake component, to rise markedly during the last portion of brake lever travel. The linear rise shown in the Figures is used for illustration convenience and is not intended to limit the disclosure.

Figure 4A:
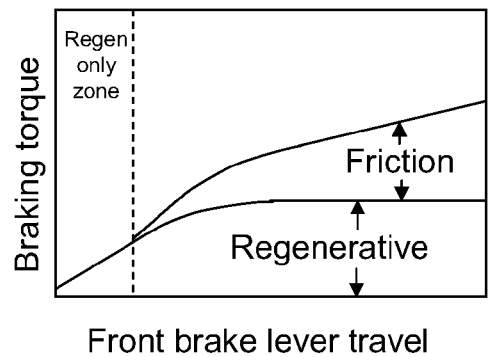

In FIG. 4A, an embodiment in which the sensor coupled to the front brake is a position sensor is shown. Instead of providing a step function increase in regenerative braking torque, as is the case shown in FIG. 3A in which the sensor is a switch, the braking torque increases monotonically with increasing brake lever travel through the regeneration only zone and continuing beyond the regeneration only zone, until it reaches the maximum possible regenerative braking torque. In an alternative embodiment, the regenerative braking is limited when applying the front brake lever. The total braking torque is the sum of the regenerative and friction braking torques.

Figure 4B:
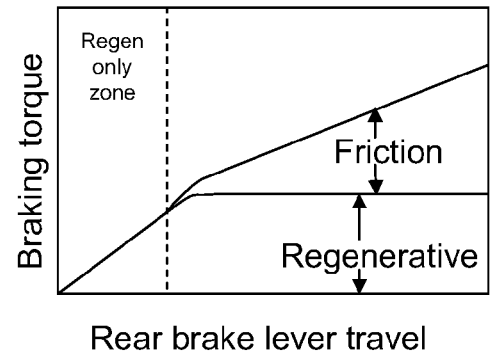

In the example shown in FIG. 4B for rear brake lever travel, the regeneration only zone is wider than for front brake lever travel. This represents one embodiment. Since the electric motor is coupled to the rear wheel, it may be useful to employ the regenerative brake substantially to its full extent before the brake lever travel at which the friction brake begins to apply braking torque. In the example shown in FIG. 4A, the operator is actuating the front brake and thus it may be desirable to apply less of the regenerative braking, which acts upon the rear wheel, before the friction brake is employed.

Figure 4C:
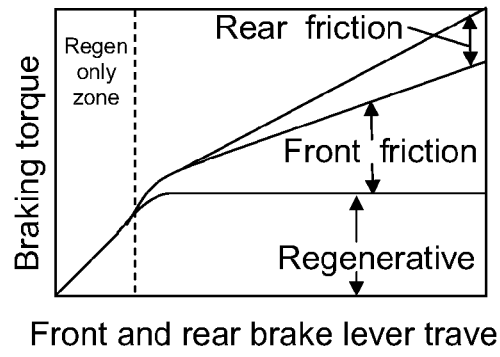

In FIG. 4C, equal, simultaneous application of the front and rear brake levers is shown. The zone in which only regenerative is applied is limited to the zone at which the front friction brake is not actuated. The rear friction brake contributes to the braking torque at greater brake lever travels. As discussed above in regard to FIG. 3C, the situation in FIG. 4C is just one example application pattern of the brakes.

Referring back to FIG. 2, in an alternative embodiment, a pressure sensor 56 is provided in hydraulic line 20. Pressure sensor 56 provides a signal to ECU 50, the signal indicating the operator's desire for braking torque. Pressure sensor 56 can supplant sensor 46 or can be used in conjunction with sensor 46. In an alternative where regenerative braking is based on a pressure signal, FIGS. 3A-C and FIGS. 4A-C are recast in terms of hydraulic fluid pressure on the x-axis in place of brake lever travel.

Figure 5A:
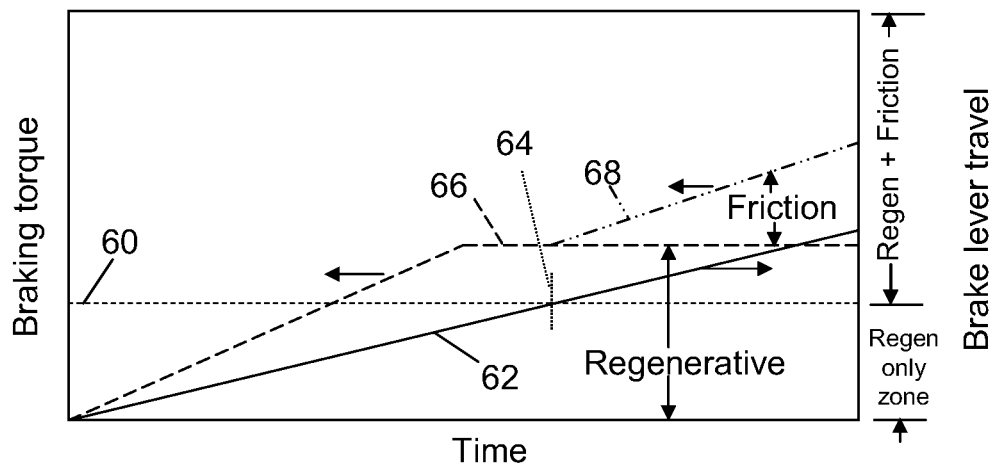
Figure 5B:
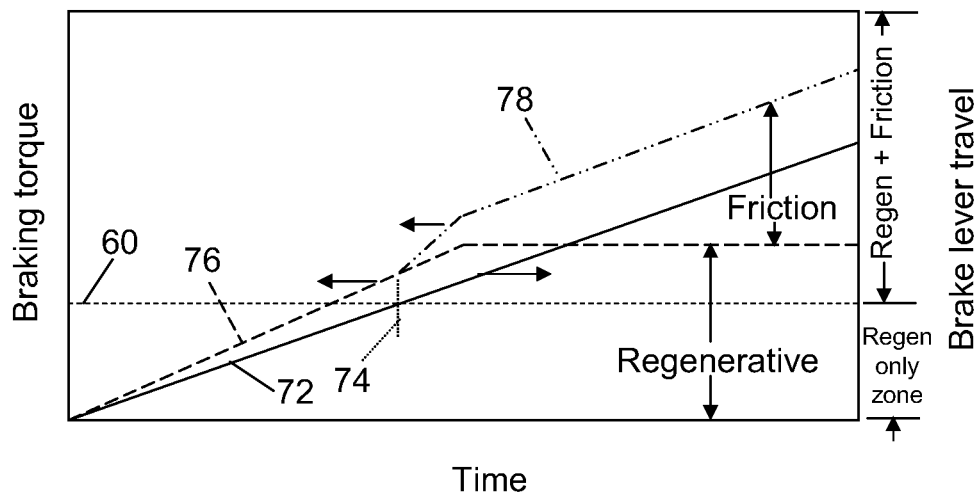

Referring to FIGS. 5A and 5B, an alternative embodiment of the disclosure is illustrated in which sensors 46 and/or 48 are on-off sensors. In FIGS. 3A-3C, the regenerative braking is applied in a stepwise manner when the sensor indicates that the brake lever is actuated. Such a strategy is appropriate in a situation in which the regenerative braking torque is modest. However, in a situation in which the regenerative braking torque is more substantial, such a strategy may provide a more aggressive braking torque characteristic than desired. The alternative captured in FIGS. 5A and 5B is one in which regenerative braking is ramped up over time.

In FIG. 5A, the brake torque on the left hand side and the brake lever travel on the right hand side are plotted as a function of time. On the right hand side, the brake lever travel has a lower range in which only regenerative braking is employed and an upper range in which both regenerative braking and friction braking are contributing to braking torque. Horizontal, dotted line 60 indicates this level of brake lever travel between the two ranges. Solid line 62 indicates brake lever travel; thus, an arrow from points from solid line 62 toward the relevant y axis on the right hand side. The situation illustrated in FIG. 5A is one in which the brake lever is applied rather more slowly, i.e., a shallower slope. The brake lever does not get into the second range of travel until the time denoted by vertical dotted line 64. To the left of 64, dashed curve 66 shows the braking torque provided by regenerative braking. The regenerative braking torque ramps up in a linear fashion, per the example in FIG. 5A, until bumping up to the maximum available regenerative braking torque. The maximum available regenerative braking torque can be limited by the maximum capacity of the generator or by a control limit set to a fraction of the maximum capacity. Once the maximum available regenerative braking torque is attained, braking torque is constant until at time 64 in which the friction brake is actuated because the brake lever is now in the second range of travel. The total braking torque increases, per dash-dot-dot line 68, which includes the regenerative and friction components of the braking torque.

In FIG. 5B, the brake lever is actuated more rapidly, as denoted by the solid line 72, which has a steeper slope than the corresponding line 62 of FIG. 5A. Regenerative braking ramps up from zero, per dashed line 76. At the time denoted by dotted line 74, the brake lever is at the interface between the regeneration only zone and the regeneration plus friction braking zone. However, the braking torque has not yet achieved the maximum available regenerative braking torque. Thus, just beyond time 74 the braking torque increases both due to friction and regenerative braking torques increasing, until the maximum available regenerative braking torque is achieved. Beyond this point, further increases are due to increases in friction braking torque only. The total braking torque, made up of both regenerative and friction torque is denoted by dash-dot-dot curve 78. Curves 62, 66, 68, 72, 76, and 78 are shown as linear relationships in FIGS. 5A and 5B, but are not intended to be limiting, but are used for convenience in illustration.

The embodiments described in regards to FIGS. 3A-C, FIGS. 4A-C, and FIGS. 5A-B apply to a situation in which a single electric motor is provided on the vehicle and to situations with multiple electric motors. In one alternative with multiple motors, the regenerative braking characteristics of the two motors are commanded to operate in lock step. In another alternative, the regenerative braking of the motor associated with one of the wheels is based on the brake lever travel of the brake lever associated with that wheel. In yet another alternative, when the brake lever associated with the rear wheel is actuated, regenerative braking is commanded to the rear wheel and to the front wheel, possibly with a lesser amount of regenerative braking commanded to the front wheel than the rear wheel.

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

What is claimed:

1. A braking system for an electric vehicle, comprising:
a first wheel coupled to the electric vehicle, the first wheel having a first friction brake and an electric motor;
a second wheel coupled to the electric vehicle, the second wheel having a second friction brake;
a first user-actuated brake lever coupled to the first friction brake, the first user-actuated brake lever having a first sensor indicating actuation of the first user-actuated brake lever;
a second user-actuated brake lever coupled to the second friction brake, the second user-actuated brake lever having a second sensor indicating actuation of the second user-actuated brake lever; and
an electronic control unit electronically coupled to the first and second sensors and the electric motor;
a hydraulic pressure sensor for use in conjunction with at least one of the first sensor and the second sensor, wherein the hydraulic pressure sensor, based on an amount of hydraulic pressure in a hydraulic line of at least one of the first friction brake and the second friction brake, being indicative of a desire for a braking torque;
wherein the first sensor is a switch indicating whether the first user-actuated brake lever is actuated and the electronic control unit commands the motor to generate electricity up to a first fraction of a maximum regeneration capacity of the motor when the first user-actuated brake lever is actuated and the second user-actuated brake lever is unactuated;
wherein the second sensor is a switch indicating whether the second user-actuated brake lever is actuated and the electronic control unit commands the motor to generate electricity up to a second fraction of the maximum regeneration capacity of the motor when the second user-actuated brake lever is actuated and the first user-actuated brake lever is unactuated;
wherein the electronic control unit commands the motor to generate electricity at a third fraction of the maximum regeneration capacity of the motor when both the first and second user- actuated brake levers are actuated, the third fraction is greater than the first fraction, and the third fraction is greater than the second fraction;
wherein a total braking torque is determined as a sum of a friction braking torque and a regenerative braking torque, the friction braking torque is generated by at least one of following: the first friction brake and the second friction brake, the regenerative braking torque is determined by a maximum available regenerative braking torque limited by at least one of the following: the first fraction, the second fraction, and the third fraction of the maximum regeneration capacity of the motor, wherein upon attaining the maximum available regenerative braking torque, at least one of the first friction brake and the second friction brake is actuated, wherein the braking torque increases monotonically until a maximum possible regenerative braking torque.

2. The braking system of claim 1 wherein the electronic control unit causes the electric motor to generate electricity based on a signal from at least one of the first and second sensors indicating that at least one of the first and second user-actuated brake levers has been actuated.

3. The braking system of claim 1, further comprising:
a first spring biasing the first user-actuated brake lever to an unactuated position; and
a second spring biasing the second user-actuated brake lever to an unactuated position wherein the first sensor is a two-position switch with a first position indicating that the first user-actuated brake lever is in the unactuated position and a second position indicating that the first user-actuated brake lever is being actuated.

4. The braking system of claim 1 wherein the first sensor provides a first signal indicating travel of the first user-actuated brake lever and the second sensor provides a second signal indicating travel of the second brake lever.

5. The braking system of claim 4 wherein the electronic control unit commands the electric motor to generate electricity in an amount which increases monotonically based on the first and second signals.

6. The braking system of claim 1 wherein the second sensor provides a signal indicating travel of the second user-actuated brake lever and the electronic control unit commands the electric motor to generate electricity in an amount which increases monotonically based on the signal.

7. The brake system of claim 1 wherein the first user-actuated brake lever has:
an unactuated position;
a lower actuation range in which the electronic control unit commands the electric motor to generate electricity and the first friction brake is unactuated; and
a higher actuation range in which the electronic control unit commands the electric motor to generate electricity and the first friction brake is actuated.

8. The system of claim 1 wherein the electric motor coupled to the first wheel is a first electric motor, the system further comprising:
a second electric motor mechanically coupled to the second wheel and electronically coupled to the electronic control unit, the electronic control unit commanding the first and second electric motors to operate as generators when at least one of the first and second user-actuated brake levers is actuated.

9. The system of claim 1 wherein the motor coupled to the first wheel is a first electric motor, the system further comprising:
a second electric motor mechanically coupled to the second wheel and electronically coupled to the electronic control unit, the electronic control unit commanding the first electric motor to operate as a generator when the first user-actuated brake lever is actuated and commanding the second electric motor to operate as a generator when the second user-actuated brake lever is actuated.

10. The system of claim 9 wherein the first and second sensors indicate a travel of the first and second user-actuated brake levers, respectively, and a braking torque commanded to the first electric motor is based on travel of the first user-actuated brake lever and a braking torque commanded to the second electric motor is based on travel of the second user-actuated brake lever.

11. A braking system, comprising:
a first wheel;
a first friction brake coupled to the first wheel;
a second wheel;
a second friction brake coupled to the second wheel;
an electric motor coupled to the first wheel;

an electronic control unit electronically coupled to the electric motor;

a first user-operated brake input device coupled to the first friction brake;

a first sensor coupled to the first user-operated brake input device and electronically coupled to the electronic control unit;

a second user-operated brake input device coupled to the second friction brake; and a second sensor coupled to the second user-operated brake input device and electronically coupled to the electronic control unit, wherein the electronic control unit commands the electric motor to operate as a generator when at least one of the first and second user-operated brake input devices is actuated;

a hydraulic pressure sensor for use in conjunction with at least one of the first sensor and the second sensor, wherein the hydraulic pressure sensor, based on an amount of hydraulic pressure in a hydraulic line of at least one of the first friction brake and the second friction brake, being indicative of a desire for a braking torque;

wherein the first sensor is a switch indicating whether the first brake input device is actuated and the electronic control unit commands the motor to generate electricity up to a first fraction of a maximum regeneration capacity of the motor when the first brake input device is actuated and the second brake input device is unactuated;

wherein the second sensor is a switch indicating whether the second brake input device is actuated and the electronic control unit commands the motor to generate electricity up to a second fraction of the maximum regeneration capacity of the motor when the second brake input device is actuated and the first brake input device is unactuated;

wherein the electronic control unit commands the motor to generate electricity at a third fraction of the maximum regeneration capacity of the motor when both the first and second brake input devices are actuated, the third fraction is greater than the first fraction, and the third fraction is greater than the second fraction;

wherein a total braking torque is determined as a sum of a friction braking torque and a regenerative braking torque, the friction braking torque is generated by at least one of following: the first friction brake and the second friction brake, the regenerative braking torque is determined by a maximum available regenerative braking torque limited by at least one of the following: the first fraction, the second fraction, and the third fraction of the maximum regeneration capacity of the motor, wherein upon attaining the maximum available regenerative braking torque, at least one of the first friction brake and the second friction brake is actuated, wherein the braking torque increases monotonically until a maximum possible regenerative braking torque.

12. The system of claim 11 wherein:

the first user-operated brake input device is mechanically coupled to the first friction brake via at least one of a cable and a hydraulic line;

the second user-operated brake input device is mechanically coupled to the second friction brake via at least one of a cable and a hydraulic line;

the first user-operated brake input device is one of a hand lever and a foot pedal; and the second user-operated brake input device is one of a hand lever and a foot pedal.

13. The system of claim 11 wherein the first and second sensors are comprised of one of linear position sensors, rotary position sensors, and angular position sensors.

14. The system of claim 11 wherein the first sensor provides a first signal indicating travel of the first user-operated brake input device and the second sensor provides a second signal indicating travel of the second user operated brake input device.

15. The system of claim 14 wherein the electronic control unit commands the electric motor to generate an amount of electricity based on the first and second signals.

16. A method to brake an electric vehicle based on a vehicle operator's input, the electric vehicle having an electric generator coupled to a first wheel of the electric vehicle, the method comprising:

determining actuation of a first brake lever based on a first sensor coupled to the first brake lever, the first brake lever being coupled to a brake provided on the first wheel;

determining actuation of a second brake lever based on a second sensor coupled to the second brake lever, the second brake lever being coupled to a brake provided on a second wheel of the vehicle;

wherein a hydraulic pressure sensor for use in conjunction with at least one of the first sensor and the second sensor, wherein the hydraulic pressure sensor, based on an amount of hydraulic pressure in a hydraulic line of at least one of the first friction brake and the second friction brake, being indicative of a desire for a braking torque;

commanding the generator to generate electricity based on at least one of actuation of the first brake lever and actuation of the second brake lever;

commanding the generator to generate electricity up to a first fraction of a maximum regeneration capacity of the generator when the first brake lever is actuated and the second brake lever is unactuated;

commanding the generator to generate electricity up to a second fraction of the maximum regeneration capacity of the generator when the second brake lever is actuated and the first brake lever is unactuated; and commanding the generator to generate electricity at a third fraction of the maximum regeneration capacity of the generator when both the first and second brake levers are actuated, wherein the third fraction is greater than the first fraction, and the third fraction is greater than the second fraction;

wherein a total braking torque is determined as a sum of a friction braking torque and a regenerative braking torque, the friction braking torque is generated by at least one of following: the first friction brake and the second friction brake, the regenerative braking torque is determined by a maximum available regenerative braking torque limited by at least one of the following: the first fraction, the second fraction, and the third fraction of the maximum regeneration capacity of the motor, wherein upon attaining the maximum available regenerative braking torque, at least one of the first friction brake and the second friction brake is actuated, wherein the braking torque increases monotonically until a maximum possible regenerative braking torque.

17. The method of claim 16 wherein:

the generator is commanded to increase monotonically up to the first fraction of maximum regeneration capacity when the first sensor is actuated and the second sensor is unactuated; and the generator is commanded to increase monotonically up to the second fraction of maximum regeneration capacity when the second sensor is actuated.

18. The method of claim 16 wherein actuation travel of the first brake lever is determined based on the first sensor coupled to the first brake lever and the generator is commanded to apply a regenerative braking force commensurate with the actuation travel of the first brake lever.

19. The method of claim 18 wherein actuation travel of the second brake lever is determined based on the second sensor coupled to the second brake lever and the generator is commanded to apply a regenerative brake force commensurate with the actuation travel of the first and second brake levers.

* * * * *